(12) United States Patent
Zhong et al.

(10) Patent No.: US 12,071,090 B1
(45) Date of Patent: Aug. 27, 2024

(54) DETECTION OF AN IMPACT WITH A VEHICLE

(71) Applicant: Zoox, Inc., Foster City, CA (US)

(72) Inventors: Xuan Zhong, San Jose, CA (US); Nam Gook Cho, Cupertino, CA (US); Evan David Cook, Woodside, CA (US); MacKenzie Cunningham, Redwood City, CA (US); Caleb Heath Norfleet, Foster City, CA (US); Rohan Agrawal, Milpitas, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/966,400

(22) Filed: Oct. 14, 2022

(51) Int. Cl.
  *B60R 21/0136* (2006.01)
  *G07C 5/00* (2006.01)
  *G07C 5/08* (2006.01)

(52) U.S. Cl.
  CPC .......... *B60R 21/0136* (2013.01); *G07C 5/008* (2013.01); *G07C 5/0808* (2013.01); *G07C 5/0825* (2013.01); *G07C 5/0833* (2013.01)

(58) Field of Classification Search
  CPC .. B60R 21/0136; G07C 5/008; G07C 5/0808; G07C 5/0825; G07C 5/0833
  See application file for complete search history.

(56) References Cited

U.S. PATENT DOCUMENTS

| | | | | |
|---|---|---|---|---|
| 2,996,137 A * | 8/1961 | Chu | ...................... | G01S 13/931 342/451 |
| 5,797,623 A * | 8/1998 | Hubbard | ............. | G01P 15/0907 73/769 |
| 6,169,479 B1 * | 1/2001 | Boran | ................. | B60R 21/0136 340/904 |
| 6,204,756 B1 * | 3/2001 | Senyk | ................. | B60R 21/0136 340/436 |
| 6,271,747 B1 * | 8/2001 | Fendt | .................... | B60R 21/013 340/436 |
| 6,370,964 B1 * | 4/2002 | Chang | ................. | G01M 5/0033 73/862.046 |
| 6,607,212 B1 * | 8/2003 | Reimer | ............... | B60R 21/0136 180/274 |
| 2002/0112526 A1 * | 8/2002 | Mattes | ................ | B60R 21/0136 73/12.09 |

(Continued)

*Primary Examiner* — Phutthiwat Wongwian
*Assistant Examiner* — Susan E Scharpf
(74) *Attorney, Agent, or Firm* — EIP US LLP

(57) ABSTRACT

An impact is detected with a vehicle having a body comprising parts which are deformable in an impact, by a secondary impact detection system configured to detect an impact that may not trigger a primary impact detection system. The secondary impact detection system comprises a plurality of deformation sensors attached to the deformable parts and configured to detect bending of the deformable parts. One or more processors are configured to receive a plurality of respective outputs from the plurality of deformation sensors, process the respective outputs to increase sensitivity to short-term changes relative to long-term changes and generate an indication of an impact dependent on detecting a processed output meeting a predetermined criterion. Outputs associated with a group of neighboring flex sensors may be used to localize the impact, characterize the source of impact, and/or reduce a likelihood of a false positive associated with the detection.

17 Claims, 13 Drawing Sheets

(56) References Cited

U.S. PATENT DOCUMENTS

| | | | |
|---|---|---|---|
| 2002/0174708 A1* | 11/2002 | Mattes | B60R 21/0136 73/12.01 |
| 2003/0051530 A1* | 3/2003 | Eisele | B60R 21/013 73/12.09 |
| 2003/0140679 A1* | 7/2003 | Roelleke | B60R 21/013 73/12.01 |
| 2004/0055805 A1* | 3/2004 | Lich | G01P 15/12 180/274 |
| 2004/0148124 A1* | 7/2004 | Nitschke | G05B 9/02 702/122 |
| 2007/0157700 A1* | 7/2007 | Dukart | B60R 21/013 73/12.09 |
| 2016/0341610 A1* | 11/2016 | Merrell | H10N 30/092 |

* cited by examiner

DETECTION OF AN IMPACT WITH A VEHICLE

BACKGROUND

A vehicle, for example an autonomous vehicle, may be configured to detect an impact that risks endangering occupants of the vehicle using, for example, an accelerometer, to deploy airbags. However, it may be advantageous to detect impacts of less severity, for example a low-speed contact with another vehicle or a pedestrian or a case of vandalism of the vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
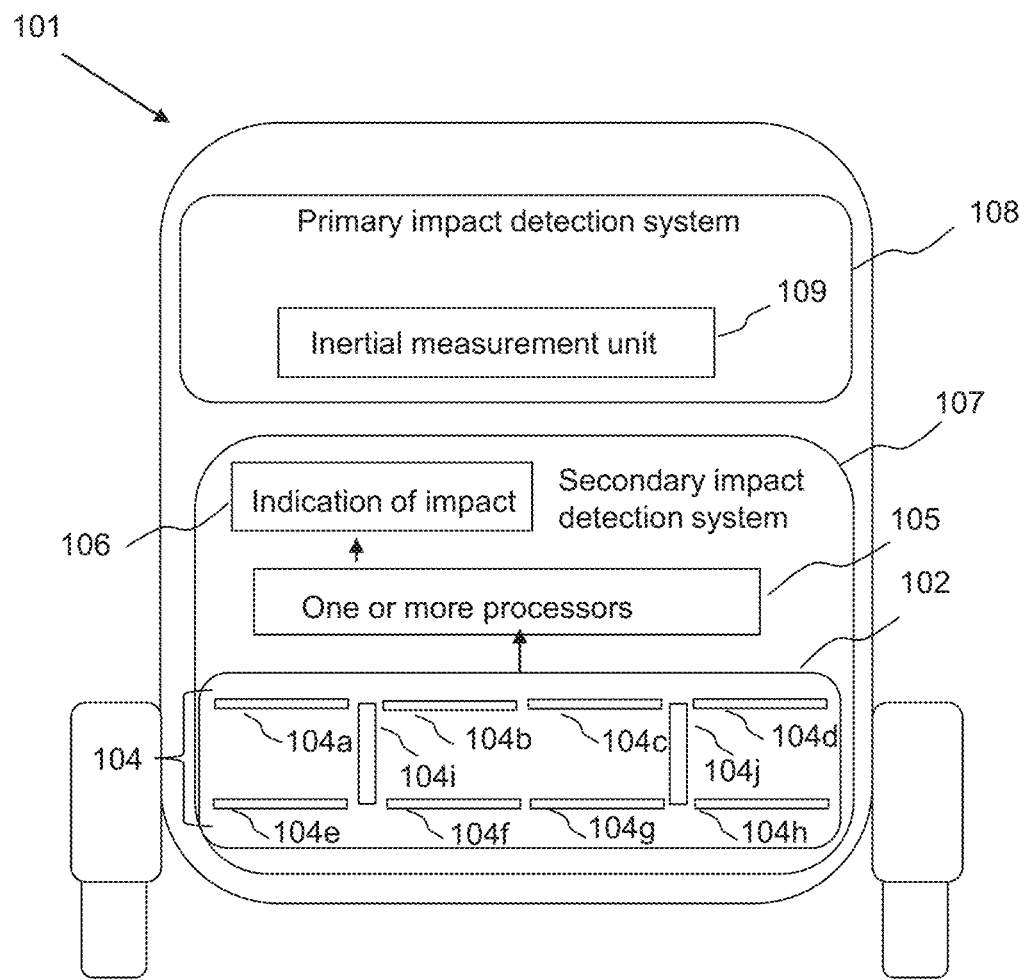
FIG. 1 is a schematic diagram showing a vehicle comprising a primary impact detection system comprising an inertial measurement unit and a secondary impact detection system comprising a plurality of deformation sensors and one or more processors coupled to the plurality of deformation sensors configured to generate an indication of an impact.

This disclosure is generally directed to a system and method for generating an indication of an impact with a vehicle, and in particular for generating an indication of an impact having insufficient force or energy to trigger a safety system, such as a restraint system, for example an airbag system. A safety system may be triggered only in the event of an impact which is deemed dangerous to an occupant of the vehicle and/or pedestrian. Such an impact may occur when the vehicle is stationary or moving, and may be caused, for example, by a collision. However, as alluded to above, various additional collisions or impacts may occur with the vehicle that do not rise to the level of requiring activation of a safety system. As non-limiting examples of such, a shopping cart may collide with a vehicle in a parking lot, an object (such as a stray ball) may collide with the vehicle, a pedestrian or bicyclist may run into the vehicle, or the like. In some cases, the vehicle may be deliberately damaged.

In some jurisdictions, it is required that a collision with a person or a collision causing more than a certain value of damage to property be reported to a public authority, for example a highway maintenance authority or a law enforcement authority. In the case of an autonomous vehicle, for example, a system that automatically reported such collisions would be beneficial. In addition or in the alternative, it may be required to stop the vehicle automatically if a collision is detected when the vehicle is in motion, regardless of the magnitude of the impact. Further in addition or in the alternative, if a vehicle is damaged, it may be beneficial to have an automatically generated indication of this, so that repair or maintenance can be carried out.

A vehicle may comprise a primary impact detection system capable of causing triggering of a safety system in response to impact detection, for example an airbag system. As described in this disclosure, the vehicle may further comprise a secondary impact detection system, which is capable of detecting impacts with insufficient energy to trigger the primary impact detection system. The vehicle may hold the indication in memory, for example as a record of a collision incident which may include a time stamp, location data and sensor data (e.g., camera, lidar, radar, etc.), for example. The vehicle may send a message comprising the indication of the impact and/or the record data, for example by a wireless data link, such a cellular radio link, to a service center and/or to a public authority to report an accident.

The secondary impact activation system may comprise one or more panels of the vehicle which are configured to deform in response to an impact. The panel may be metallic or composed of another deformable material. For example, the vehicle may have a body comprising panels, which are elastically deformable in a low energy impact, for example an impact with insufficient energy to trigger a restraint system. For example a bumper, fender, a front and/or a rear fascia panel, which may be made from a non-metallic material such as a polymer or composite material, may be elastically deformable in such a low energy impact. As described in this disclosure, some or all of the body parts or panels are provided with deformation sensors, which may produce an output in response to bending, that is to say flexing or deformation, of the body parts. The deformation may be elastic, in which case the part returns, at least approximately, to the shape which it had prior to the impact. In other cases, the deformation in the impact may be inelastic.

As described in this disclosure, deformation sensors are provided that are configured to detect deformation of a panel. The deformation sensors may be attached to the panel, which may be, for example, an external panel of the vehicle. The deformation sensors may be attached by adhesive and may be attached to the interior or exterior of the panel. The deformation sensors may be embedded in the panel, for example between laminated layers. The deformation sensors may be distributed across the external parts of the vehicle. In various examples, the deformation sensors are provided with greater density per unit area to parts of the vehicle more likely to experience an impact, such as the facia panels, and to parts of the vehicle which are more flexible, and so more likely to be deflected in a low energy impact of the types already mentioned.

Various types of deformation sensor may be used including, for example, flex sensors which have a resistance that varies according to a curvature imposed on the sensor. In some examples, the flex sensors may be of a type that is designed to have a resistance that is varied by a process of controlled crack propagation. The resistance is typically converted to a voltage and/or a digital signal as an output of the sensor. Alternatively, or additionally, the deformation sensors may be of a type that operates using a piezo-electric effect. Other types of deformation sensors, also known as bend sensors, are available operating according to various principles. Each deformation sensor may produce an independent output, which may be an analog or a digital signal (e.g., of voltage, amperage, etc.), which may be associated with the degree of bending of the sensor.

Deformation sensors may be used that are based on strain gauges, that may detect deformation or bending of a panel by measuring a stretching of a surface. Deformation sensors may also be used that are based on measuring a gap between parts of a panel, or parts attached to a panel, which are configured such that the size of the gap may vary if the panel is deformed. For example, the size of a gap may be measured by measuring a capacitance of the gap.

A deformation sensor may include a sensing element, which may have a physical property that varies with deformation, for example a resistive track that varies in resistance with bending. The deformation sensor may also have an interface element, for example an electronic circuit that senses the physical property and converts this to a signal, such as a digital or analog electronic signal, which forms an output from the sensor. The signal, that is to say output, may be processed through various stages of signal processing, such as DC offset removal, filtering to remove high and/or low frequency components and/or noise.

After an impact, the deformable parts of the vehicle body may return to approximately their pre-impact shape, although this may take seconds, minutes or longer. Also, the deformable parts may change shape slightly with time, for example due to temperature changes. The outputs of the deformation sensors may also change with time due to various environmental effects in the sensors themselves. Accordingly, the outputs from deformation sensors, before the signal processing as described in this disclosure, have various components that are unrelated to an impact event. As will be described in detail herein, multiple techniques may be used in various examples to ensure the absence of a false alarm (false positive), such as use of a threshold with an unprocessed output of a sensor, combining signals from multiple such sensors, as well as the use of various other sensor modalities to confirm an impact.

In order to detect an impact with an improved probability of detection and for a lower false alarm rate, as will be discussed in detail below, the outputs of the deformation sensors may be processed to increase sensitivity to short-term changes relative to long-term changes. For example, this may involve high-pass filtering to remove more slowly changing and zeroth order (e.g., direct current (DC)) components. As described in this disclosure, the increased sensitivity to short-term changes relative to long-term changes may be achieved effectively by processing the outputs of one or more deformation sensors to calculate a ratio of a short-term average to a long-term average for a respective output. Using such a ratio may provide detection of impulsive changes in the outputs of the deformation sensors, while rejecting slower drifts in the outputs. The short-term average and long-term average may be calculated using multiple sliding windows of varying width applied to samples of the output of the deformation sensor, with DC offset removed, on a continuous basis, and the ratio between the two may also be calculated on a continuous basis, so that the ratio is in effect a signal processed, or filtered, version of the output of the deformation sensor. In at least some examples, the signal representing the ratio may then be compared with a threshold to detect an impact.

In various examples, the short-term average may be taken over a sliding window of n milliseconds, for example 5 milliseconds, and the long-term average may be taken over a sliding window of n×1000, for example 5000 milliseconds. Other time periods and ratios between short and long time periods may be used. The periods used for the short-term average and long-term average are dependent on material properties of the panel to which the deformation sensors are attached, and the dynamics of the expected collision types that are to be detected. The short-term average period may be chosen to be approximately similar to a period of expected deformation, in an impact, of the panel to which the deformation sensor is attached. As a non-limiting example, the Young's modulus and/or other physical property may be used to determine the various window sizes for the filters. In practice, various types of impact may cause different periods of deformation. For example, a slow collision with a vehicle could cause a more prolonged deformation than an impact with a small but fast-moving object. A mid-range value of short-term average period may be chosen to give good overall results for a variety of types of collision. The period over which the long-term average is taken may be chosen to be significantly longer than the period of expected deformation, so that the long-term average is not significantly altered by the signal produced by the deformation sensor during the deformation event, that is to say the impact. However, the period of the long-term average may also be chosen to be shorter than a period of expected slow drifts in the output of the deformation sensor, for example due to temperature changes and/or other vibrational modes associated with operation of the vehicle.

In certain examples, however, a filtered output meeting one or more predetermined criteria may be associated with a false positive response. To reduce the probability of false positives, the outputs of a group of neighboring deformation sensors may be used to further discern whether an impact occurred. As will be described in more detail below. If the neighboring deformation sensors also indicate that an impact occurred, then an indication of an impact may be generated with an increased likelihood (increased certainty) that the response is a true positive. Outputs of other sensors of the vehicle such as audio, lidar, video and radar sensors, may also be processed to further reduce the probability of false alarm of an indication of an impact with the vehicle. For example, it may be required that an array of audio sensors detect sounds associated with an impact to confirm that the impact has taken place, in order to generate the indication of the impact. Additional details of such techniques may be found in U.S. patent application Ser. No. 17/554,570 filed on Dec. 17, 2021 entitled "Event Detection and Localization Using Audio," the entire contents of which are hereby incorporated by reference. It may also be required that the processed outputs of deformation sensors located away from the neighboring group meet given criteria, to reduce the probability that the sensors have been triggered to a general shock to the vehicle, rather than an impact with the vehicle. For example, it may be required that the outputs of no more than a specified number of sensors may exceed specified thresholds, or a sum of the outputs may not exceed a given limit, in order to generate the indication of a low energy impact.

In various examples, it may be required that to generate an initial indication of the impact, at least one filtered output of a deformation sensor, where the filtering comprises for example generating a ratio of a short-term to long-term average, exceeds a threshold for that deformation sensor. The threshold for a deformation sensor output may be dependent on the stiffness of the elastically deformable body part at the location of the deformation sensor. It may also be required that neighboring deformation sensors also exceed respective thresholds, which may be lower than those required to generate the initial indication for a respective sensor. For example, a threshold for a given deformation sensor as a neighbor may be a tenth of the threshold required for that deformation sensor to generate an initial indication of the low energy impact. Other proportions may be used. It may be required that all of a group of sensors in a group of neighboring deformation sensors have filtered outputs exceeding the respective thresholds for neighbors, or it may be required that a given proportion of the neighboring deformation sensors have filtered outputs exceeding the respective thresholds for neighbors. In at least some examples, use of multiple sensors may also provide an indication of where the impact took place on the vehicle.

In order to determine which deformation sensors are neighbors, groups of neighboring deformation sensors may be determined, that are spatially associated with each deformation sensor. For example, the group may be determined by physical proximity and/or by trial impact tests to establish which deformation sensors produce changes to their outputs according to the location of the impact. As will be described in detail herein, a mapping of such proximity may be stored or otherwise accessible to the vehicle.

The techniques described in detail herein may improve the safe operation of a vehicle by detecting impacts that would otherwise not trigger operation of a safety system. In response, the vehicle may perform one or more actions to ensure the continued safety of occupants and surrounding pedestrians, including stopping, recording data, transmitting signals to third parties, and the like. Further, the techniques described herein may improve the functioning of a computing system by reducing the complexity and/or computational resources needed to resolve an impact of low energy, including a location. While the techniques described herein are discussed with respect to vehicles (and more specifically autonomous vehicles), the disclosure is not meant to be so limiting. The same or similar techniques may, for example, be applied to any vehicle, aircraft, vessel, or otherwise.

FIG. 1 shows a system comprising a vehicle 101 having a primary impact detection system 108 and a secondary impact detection system 107. The primary impact detector system may trigger/actuate a safety system such as controlling the activation of air bags and other restraints such as seat belt pre-tensioners in response to a detection of an impact by an inertial measurement unit 109. For example, an impact of greater than 10,000 Joules may trigger the activation of the restraint. Various other techniques may be implemented and/or sensors may be used to determine activation of the primary impact detection system 108, including, for example, output from perception and/or prediction systems which provide a certainty of impact, audio sensors, and the like. The primary impact detection system may be capable of causing the safety system to change state from a first state, the first state being a state before triggering of the safety system, to a second state, the second state being a triggered state, in response to impact detection.

The secondary impact detection system 107 may be configured to detect impacts with a lower energy than the primary impact detection system 108. Accordingly, the secondary impact detection system may be capable of generating an indication that an impact has occurred in a case where the safety system is in the first state The secondary impact detection system may comprise a part of the vehicle, for example a panel 102 which is configured to deform in an impact, a plurality of deformation sensors 104 and one or more processors 105 coupled to the plurality of deformation sensors 104 configured to generate an indication of an impact 106. Of course, the one or more processors 105 may be the same as those associated with the primary impact detection system 108.

In various examples, the front of the vehicle may be similar to the rear of the vehicle, that may be designed to be bi-directional (e.g., having substantially similar capabilities and/or controls when driving in either direction). As illustrated, the deformable parts comprise a panel 102, which may be elastically deformable and made of a polymer or composite material that covers parts of the front/rear of the vehicle, which may be referred to as a bumper or fascia, for example. The panel typically forms part of the overall exterior of the vehicle, providing a resilient and relatively soft surface which is typically intended to reduce damage caused to pedestrians or objects in a collision and to retain its shape and appearance as far as possible after suffering a low speed/low energy collision. The deformable parts of the vehicle may also include fenders over the wheels. The vehicle may have other parts configured to be deformable in an impact, in addition to the bumpers/fascia panels on the front and/or back of the vehicle and the fenders, front and rear, for example panels on the sides of the vehicle and/or the roof and/or underside of the vehicle body. These may also be equipped with deformation sensors. The vehicle body may have a metallic structure, typically composed of steel or aluminum, which is relatively stiff in comparison to the elastically deformable parts.

In the example illustrated in FIG. 1, the deformation sensors 104 are in the form of elongated strips, that are attached to the deformable body parts. The deformation sensors may, for example, be attached (e.g., using an adhesive, etc.) to the inward-facing side of a panel, the exterior of the panel, or may be embedded in or integrally formed with the panel. The layout of the arrangement of the strips across a panel may be configured to detect flexing along two orthogonal axes at different parts of the panel, by arranging the sensors in an approximate grid pattern. However, other arrangements are possible. One or more deformation sensors may be attached to each fender, in a similar manner to the attachment to a facia panel.

An example of a deformation sensors that may be suitable for uses as described in this disclosure are Bend Sensor thin film flex sensors manufactured by Flexpoint Sensor Systems, which change resistance with bending due to crack propagation in the thin film deposition. For example, a single flex sensor may have a width of 2 cm and a length of 24 cm and a thickness considerably less than the width. In another example, a strip comprising 7 flex sensors, each 9.5 cm long, has a total length of 72 cm and a width of 1.5 cm. In another example, a strip comprising 4 flex sensors, each 17 cm long, has a total length of 72 cm and a width of 2 cm. In various examples, such spacing, sizing, etc. may be based at least in part on a size of the panel, a resolution of the magnitude or location of the impact desires, a material property of the panel and the like. The resistance of each sensor may be measured separately. The sensitivity of a flex sensor may depend on its length and so if sensors of different lengths are used, the output of a flex sensor may be adjusted according to its length relative to other sensors to provide a more equal sensitivity to bending between sensors. Furthermore, some sensors may be attached to a region of the elastically deformable part of the body that is stiffer than the parts to which other sensors are attached. The output of a flex sensor may be adjusted according to the stiffness of the elastically deformable body part to which it is attached, relative to the stiffness of the regions of the elastically deformable body parts to which other sensors are attached to provide a more equal sensitivity to bending between sensors. The adjustments to the output may be in terms of gain to give a consistent voltage output as a function of bending across the arrangement of flex sensors. Alternatively, the respective thresholds may be adjusted to account for differences in sensitivity between sensors.

In the example of FIG. 1 the one or more processors 105 configured to generate the indication of low energy impact 106 are shown within the vehicle. The processors 105 may, for example, be part of a vehicle computing device used to provide processing for other functions of the vehicle such as autonomous driving. The processors 105, in the alternative, may be a stand-alone processor, may be cloud processing external to the vehicle, or any combination of these systems.

Figure 2:
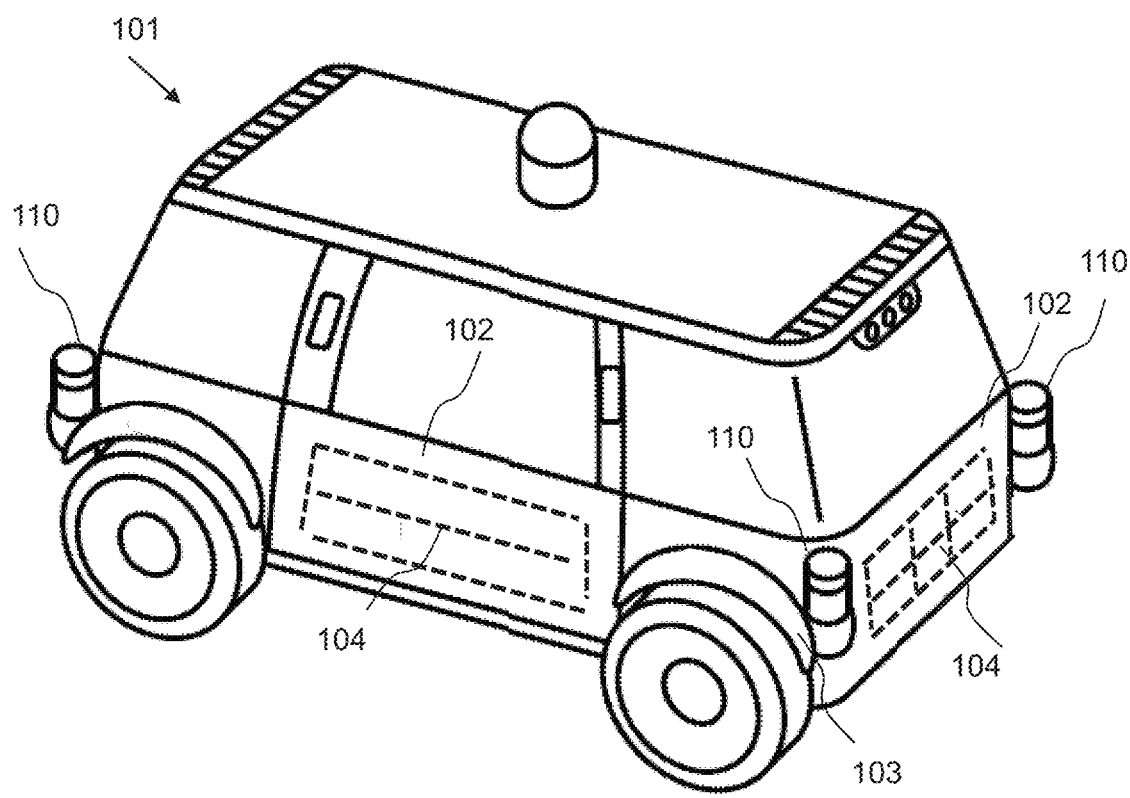
FIG. 2 shows a perspective view of a vehicle having deformable panels on the front/back and sides to which deformation sensors are attached.

FIG. 2 shows a perspective view of an example vehicle 101 having deformable panels 102 on the front/back and sides to which deformation sensors 104 are attached. Also shown are sensor pods 110, in this case attached to each corner of the vehicle. The sensor pods may be provided with a variety of sensors, including for example microphones, radar sensors, LIDAR sensors and video sensors. The sensor pods 110 are an example of a location where sensors may be placed, but in other examples sensors may be placed on other parts of the body, for example on the pillars or on the roof. Fenders 103 may be configured to be deformable in an impact and which may be provided with deformation sensors. Of course, such positions are depicted for illustrative purposes only and are not meant to be so limiting.

Figure 3:
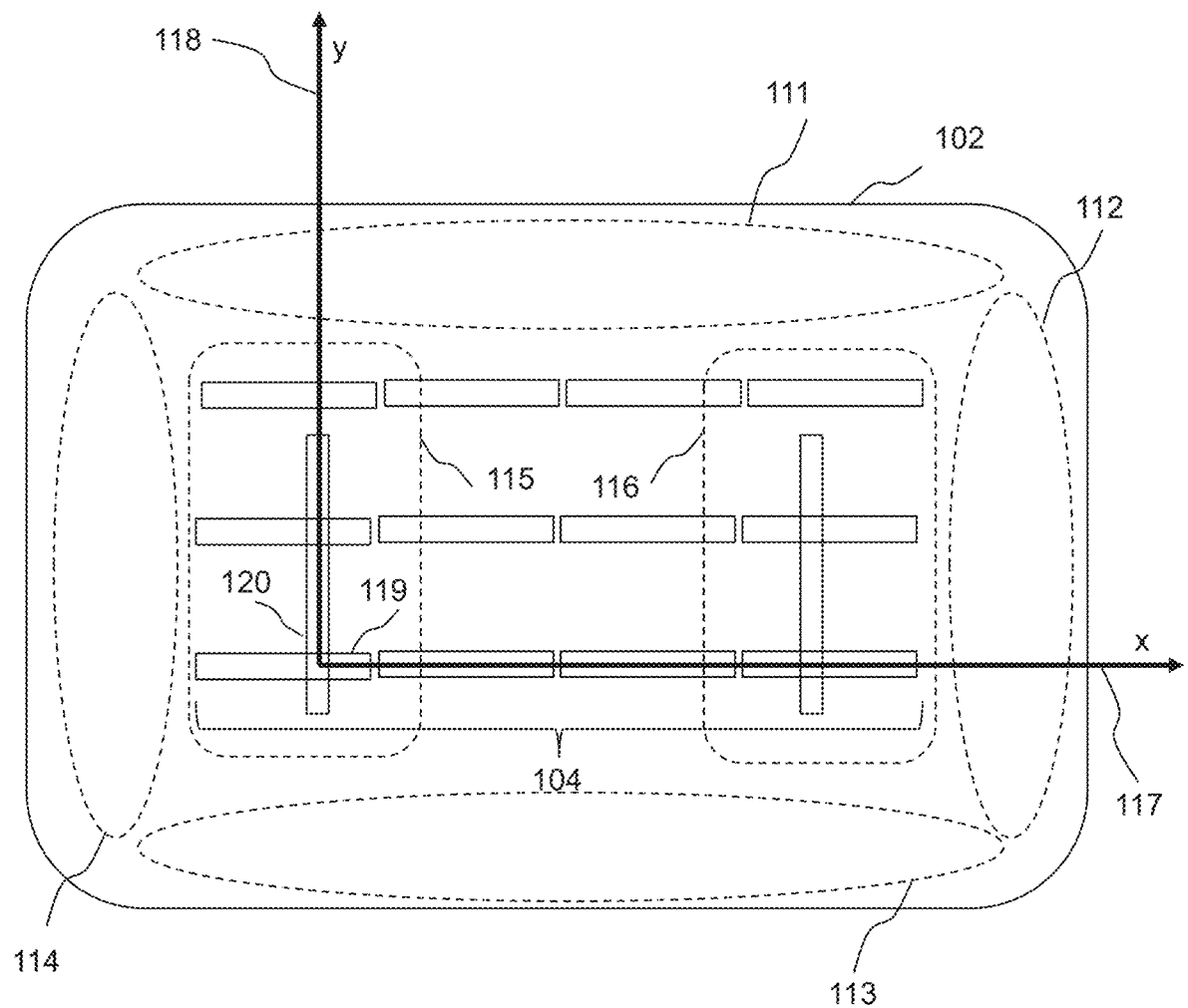
FIG. 3 is a schematic diagram showing an example of positioning of deformation sensors configured to detect bending of a deformable part of a vehicle.

FIG. 3 is a schematic diagram showing an example of positioning of deformation sensors 104 configured to detect bending of a deformable part of a vehicle. This example shows that the deformation sensors are disposed to detect flexing along two orthogonal axes, for example x axis 117 and y axis 118, and at least one deformation sensor for one axis, for example deformation sensor 119 for the x axis overlies a deformation sensor for the other axis, for example deformation sensor 119 for y axis. In at least some examples, overlying a deformation sensor of one axis over the deformation sensor for another axis may be beneficial in providing confirmation in two axes of an impact. A deformation sensor overlying another deformation sensor may be included in a group of neighbor deformation sensors whose outputs are processed to reduce a probability of false alarms/positives. As will be discussed further herein, data relating the relative arrangement of the sensors 104 may be stored or otherwise accessible to the vehicle such that a lookup may be performed to determine one or more sensors 104 that may be proximate one another. In at least some examples, such data may also be associated with an axis (e.g., whether oriented along the first or second axis), a length of the sensor, a normalization component, a relative stiffness, a shape of the associated panel portion, and the like.

Some areas of the panel may have a higher stiffness, that is to say a lower flexibility, than other areas. In the example shown, areas 111, 112, 113 and 114 have a relatively higher stiffness due to underlying structural parts and areas 115 and 116 have relatively lower stiffness and higher flexibility. The deformation sensors are distributed across the panel to provide a greater number of sensors per unit area in an area having greater flexibility than a number of sensors per unit area having less flexibility. The areas having greater flexibility may also be areas in which an impact is more likely and/or more likely to cause damage to the vehicle.

Figure 4:
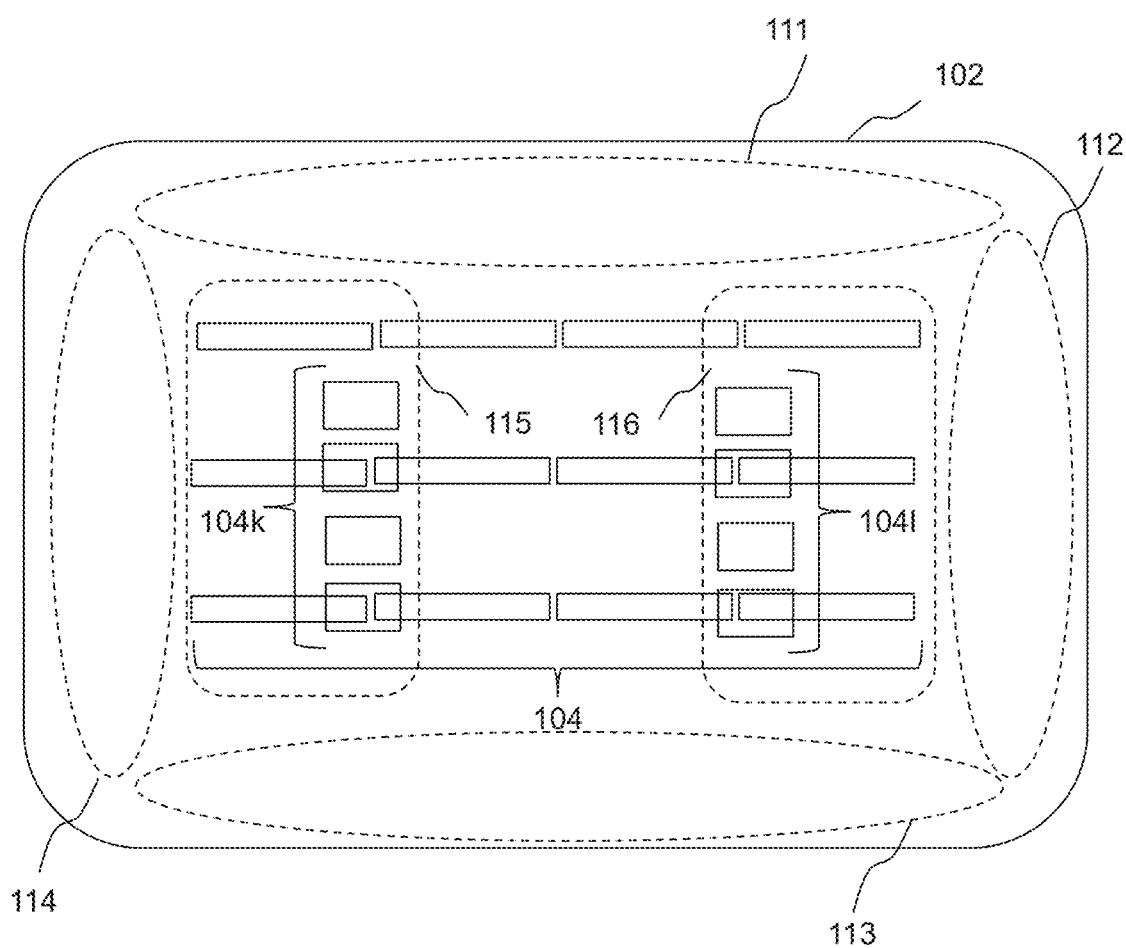
FIG. 4 is a schematic diagram showing a further example of positioning of deformation sensors configured to detect bending of a deformable part of a vehicle.

FIG. 4 is a schematic diagram showing a further example of positioning of deformation sensors configured to detect low energy impacts of a deformable part of a vehicle. Any number of relatively short sensors, as illustrated the four relatively short sensors 104k and 104l, may be used as an alternative to a relatively long sensor and/or any of the other sensors 104, as depicted in FIG. 3. A short sensor may be made to have an equivalent resistance to a long sensor or any other sensor 104, by adjustment of the width and length of the resistive tracks within the sensor. The more compact dimensions may be advantageous in allowing finer resolution of deformation effects, potentially enabling more accurate location of an impact and/or recognition of an object in collision with the panel.

Figures 5A, 5B:
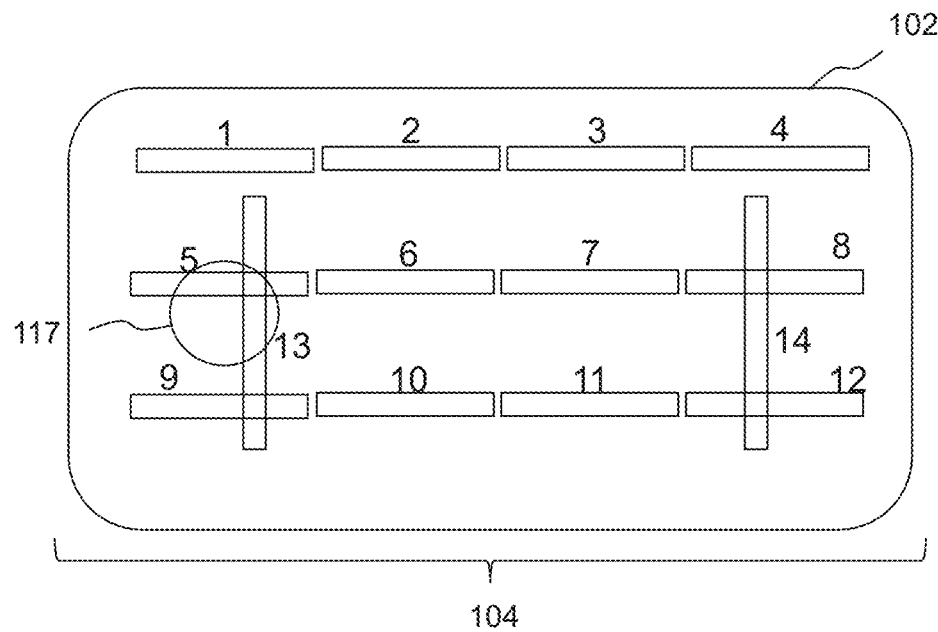
FIG. 5A is a schematic diagram showing a location of an impact with the deformable part shown in FIG. 3 In various examples.
FIG. 5B is an example of a table showing a group of neighboring deformation sensors for each deformation sensor in the example arrangement of deformation sensors shown in FIG. 5A.

FIG. 5A is a schematic diagram showing an example of a location of an impact 117 with panel 102 having a plurality of deformation sensors 104. The deformation sensors are numbered arbitrarily 1-14 for reference.

FIG. 5B is an example of a table, using the numbering system of FIG. 5A, which relates each sensor to a group of neighbor sensors for the sensor. The neighbor sensors may be chosen according to proximity to a given sensor, and according to the stiffness of the panel in the location of each sensor. A group of sensors may be a group that are each required to have outputs meeting a criterion, such as meeting or exceeding a threshold, in order that an indication of an impact may be generated. Requiring each of a group of sensors to have an output that meets or exceeds a threshold for that sensor may improve a tradeoff between probability of detection and false alarm. The neighbor sensors for each sensor may be held in a look-up table. In various examples, such a table (or dataset) may further be associated with one or more of a relative distance between sensors, relative orientation between sensors, relative resistances (or, otherwise, response characteristics to bending to be used for normalizing signals between), relative stiffness of the associated areas, and the like.

For illustrative purposes, an impact is represented in FIG. 5A by the circle 117. It can be seen that the impact is directly in the region to which deformation sensor 13 is attached, and just adjacent to the region to which deformation sensor 5 is attached.

For example, it can be seen that deformation sensor 13 has neighbor deformation sensors 1, 5 and 9. It can be seen in this example that the sensors 1, 5 and 9 are located in close proximity to deformation sensor 13, and indeed deformation sensor 13 overlies deformation sensors 5 and 9. A potential impact detected initially by the output of deformation sensor 13 exceeding a threshold would be expected to also cause a change in the output of the deformation sensors 1, 5 and 9 if the impact is real and not a false alarm caused by sensor 13. The data in the table of FIG. 5B may be generated on the basis of physical proximity of the deformation sensors to one another and/or may be generated by experimental impacts with a representative panel and monitoring of the relative magnitudes if the outputs of the sensors. According to the techniques discussed in detail herein, use of the various outputs of the sensors may be used to localize the impact to circle 117.

Figure 6:
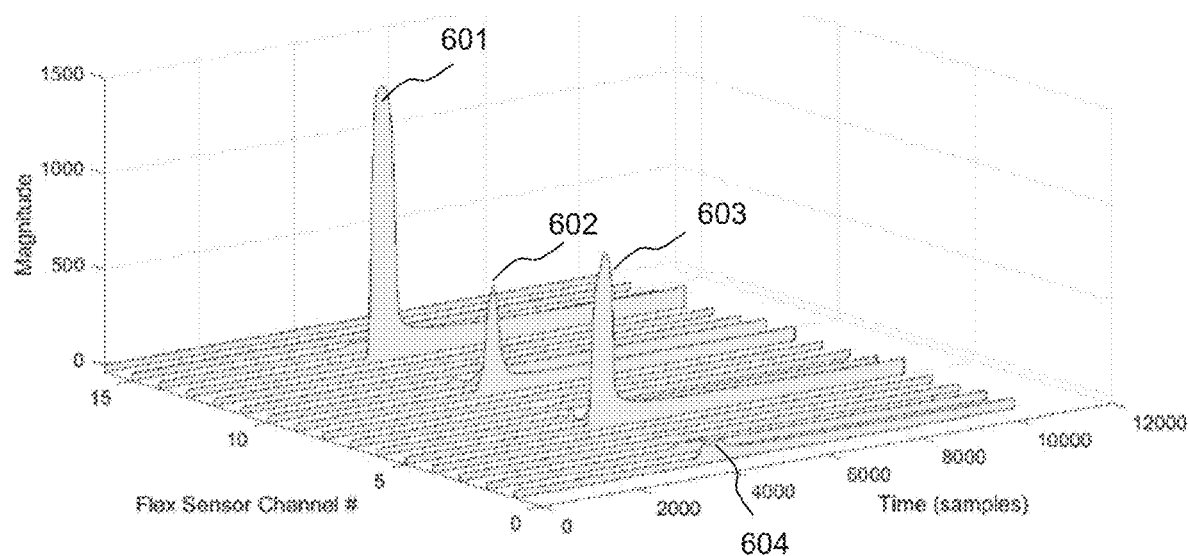
FIG. 6 is a schematic diagram showing a graphical representation of the outputs from the deformation sensors caused by an impact having the location shown in FIG. 5A In various examples.

FIG. 6 is a schematic diagram showing a graphical representation of an example of processed outputs from the deformation sensors caused by an impact having the location shown in FIG. 4. The processed outputs may be, for example, the ratio of a short-term average to a long-term average for a deformation sensor output, as already mentioned, or any other process as discussed. The ratio may be a continuous stream of samples in time, as a result of the short-term average and long-term average being running averages of samples of the deformation sensor output. In any such example, the windows for the short- and long-term averages may be aligned based at least in part on a most recently received sample.

It can be seen that deformation sensor channel 13, representing the output from deformation sensor 13, has the highest peak 601. Deformation sensor channel 5, representing the output from deformation sensor 5, has the next highest peak 603, followed by deformation sensor channel 9, representing the output from deformation sensor 9, which has a lower peak 602. It can be seen that that deformation sensor channel 1, representing the output from deformation sensor 1, has a significant but relatively low peak 604.

In various examples, the outputs may be processed as follows. An initial indication of a low energy impact is generated on the basis that the output from sensor 13 meets a pre-defined criterion, for example crossing a threshold. A group of neighboring deformation sensors is determined by consulting a look-up table having, for example, the data of FIG. 5B. The look up table indicates that the neighboring deformation sensors are sensors 5, 9 and 1. The outputs of the neighboring deformation sensors are examined to confirm that they meet pre-defined criteria. The pre-defined criteria may be that each of the neighbor deformation sensors exceeds a respective threshold, which may be lower than the threshold that would need to be exceeded for an initial detection. The respective thresholds may be the same for each deformation sensor or may be adjusted for each sensor according to test data or according to proximity to the sensor on which the initial detection was made. For example, the thresholds for neighboring sensors may be adjusted according to distance from the sensor on which the initial detection was made. For example, a required threshold may decline linearly, non-linearly, or otherwise in voltage with distance within the group of neighbor sensors, or otherwise according to an empirically derived function of distance. The pre-defined criteria may be that more than a certain proportion or number of the sensors in the neighbor group produce outputs above their respective threshold. If the criteria are met, then an indication of a low energy impact may be generated. The generation of the indication may be dependent on confirmation by processing the outputs of other sensors, such as an array of audio sensors and/or video and/or radar sensors. For example, it may be required that an object is detected by a video system in collision with the vehicle within a window of time corresponding to the time that an impact was detected by processing the outputs of the deformation sensors, in order to generate the indication of the impact. It may be required that a sound is detected at one or more microphones within the time window, or that an object is detected by a radar or LIDAR system. In various examples, the impact may be localized based on the signals from the various neighbors and the original detecting sensor. For example, the relative signal strengths illustrated in FIG. 6 may be used to triangulate the location of the impact (e.g., circle 117 of FIG. 5A) based at least in part on the relative voltages, ratios, positions, orientations, etc.

Figure 7:
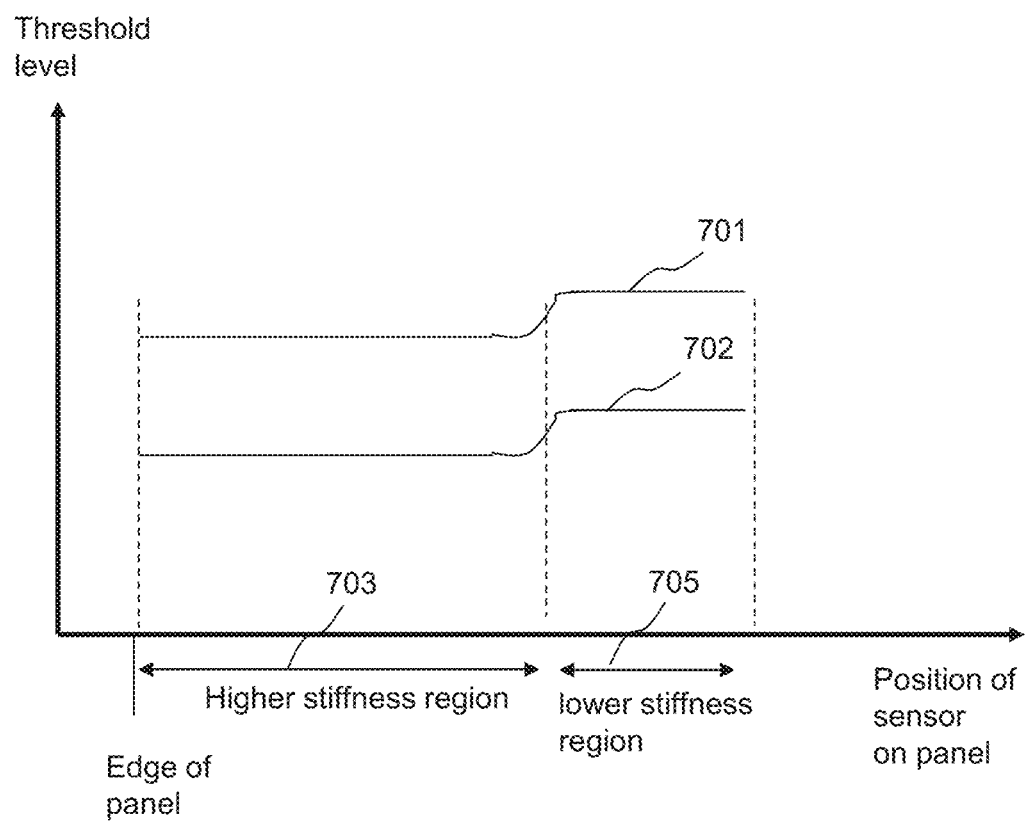
FIG. 7 is a graph illustrating dependence of threshold level as a function of position of a deflection sensor, showing a variation of threshold level with stiffness of a panel to which deflection sensors are attached.

FIG. 7 is a graph illustrating dependence of the threshold level as a function of the position of a deflection sensor on a panel, showing a variation of the threshold level with the stiffness of the region of the panel to which deflection sensors are attached. It can be seen that, in a region where the panel has a relatively high stiffness 703, the threshold 701 may be lower than the threshold in a region where the panel has a relatively low stiffness 705. This is because a given energy of impact may be expected to cause a greater deflection, and so a greater output from a deflection sensor, in an area of lower stiffness than in an area of higher stiffness. The threshold 701 shown in FIG. 7 may be a threshold for initial detection of an impact from a single sensor. Following initial detection, a group of neighbor sensors may be required to have an output meeting a lower threshold 702 to confirm detection, as already discussed. The lower threshold may be, for example, one tenth of the threshold for initial detection. As shown in FIG. 7, the lower threshold may also be dependent on the stiffness of the panel.

Figure 8:
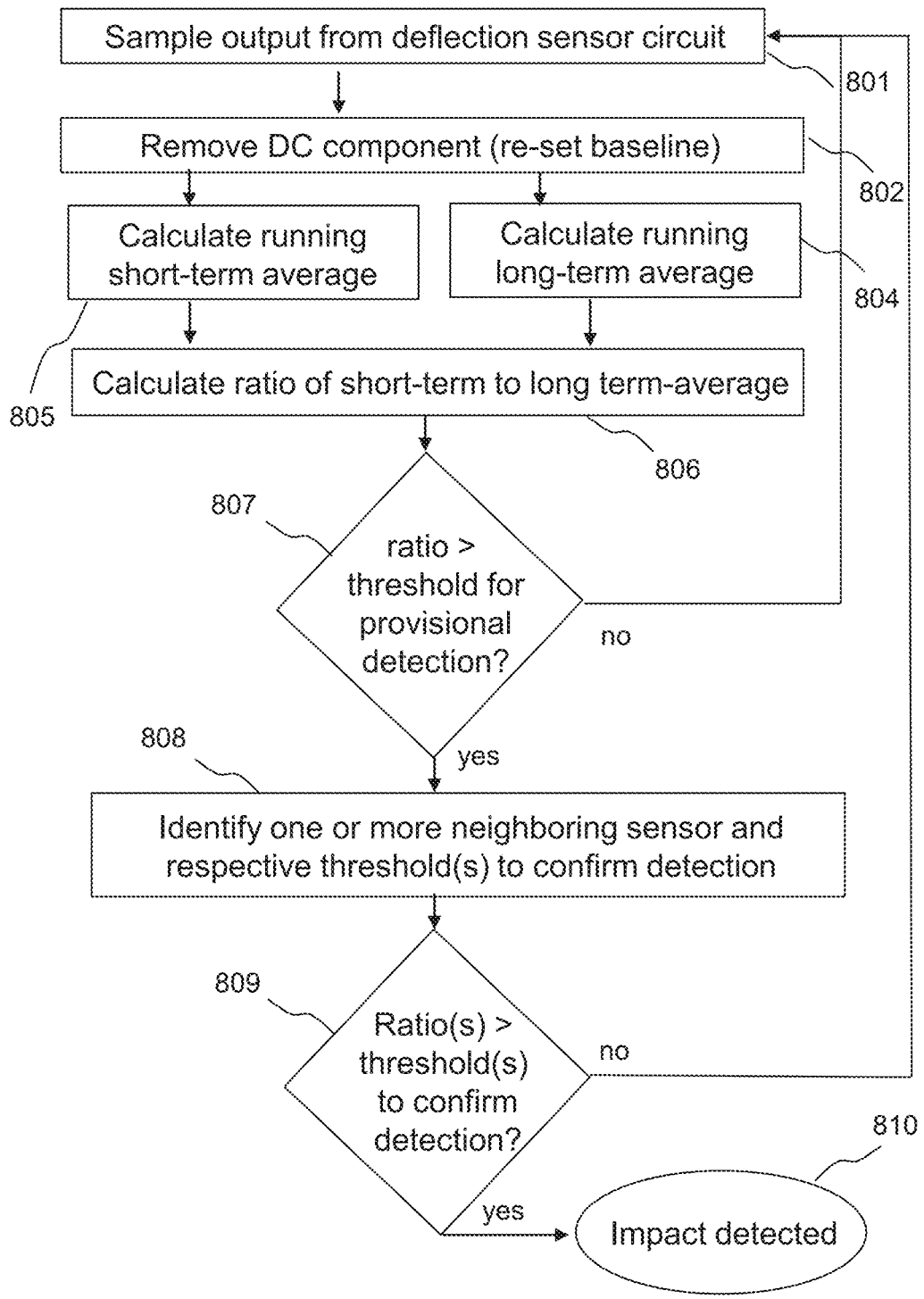
FIG. 8 is a flow diagram illustrating a method of detecting an impact.

FIG. 8 is a flow diagram illustrating a method of detecting an impact. This process may be repeated for each of a plurality of deflection sensors. First, at 801, an output of a deflector circuit is sampled, for example using an analogue to digital converter, to produce a series of samples. At 802, the samples may be filtered (for example, using a high-pass filter) to remove a constant (DC) component. This re-sets the baseline to remove a spurious offset that does not represent a meaningful signal. It may be beneficial to remove an offset, because an offset may dominate an average of the samples, which may reduce sensitivity to s signal and reduce dynamic range. In some examples, such a filtering need not be performed where a difference (or other computation) is performed using the long- or short-term windows, as the DC offset will be effectively subtracted from considerations. Regardless, a small component of offset may be allowed to remain, to avoid a zero mean being calculated for the long-term average.

A running short-term average and a running long-term average are calculated, at 804 and 805, based on respective short (e.g. 5 milliseconds) and long (e.g. 5 seconds) sliding time windows. A ratio of the short-term average to the long-term average is calculated, at 806, also on a running basis, that is to say it is updated every sample, or in some other periodicity. In various examples, other operations may be performed to further improve the signal to noise of the output including, for example, squaring the resulting difference between the long- and short-term averages. As discussed above, performing this difference may eliminate any DC-bias in the output signals. Such a squared difference (or other computation) may be used anywhere described herein where a ratio is discussed. The ratio is compared, at 807, to a threshold for provisional detection for the deflection sensor. If the ratio is greater than or equal to the threshold, then one or more neighboring deflection sensors is identified, at 808, for example by consulting a look-up table, and a respective threshold is established for each, to confirm detection. If not, the process repeats from 801. The threshold to confirm detection by neighboring sensors is typically lower than would be required for initial detection of an impact at the sensor. If the output of each neighboring sensor, which may be processed to calculate a ration of short-term to long-term average, is greater than its respective threshold, at 809, then an impact may be determined to have occurred, at 810. If not, then the process repeats from 901.

Figure 9:
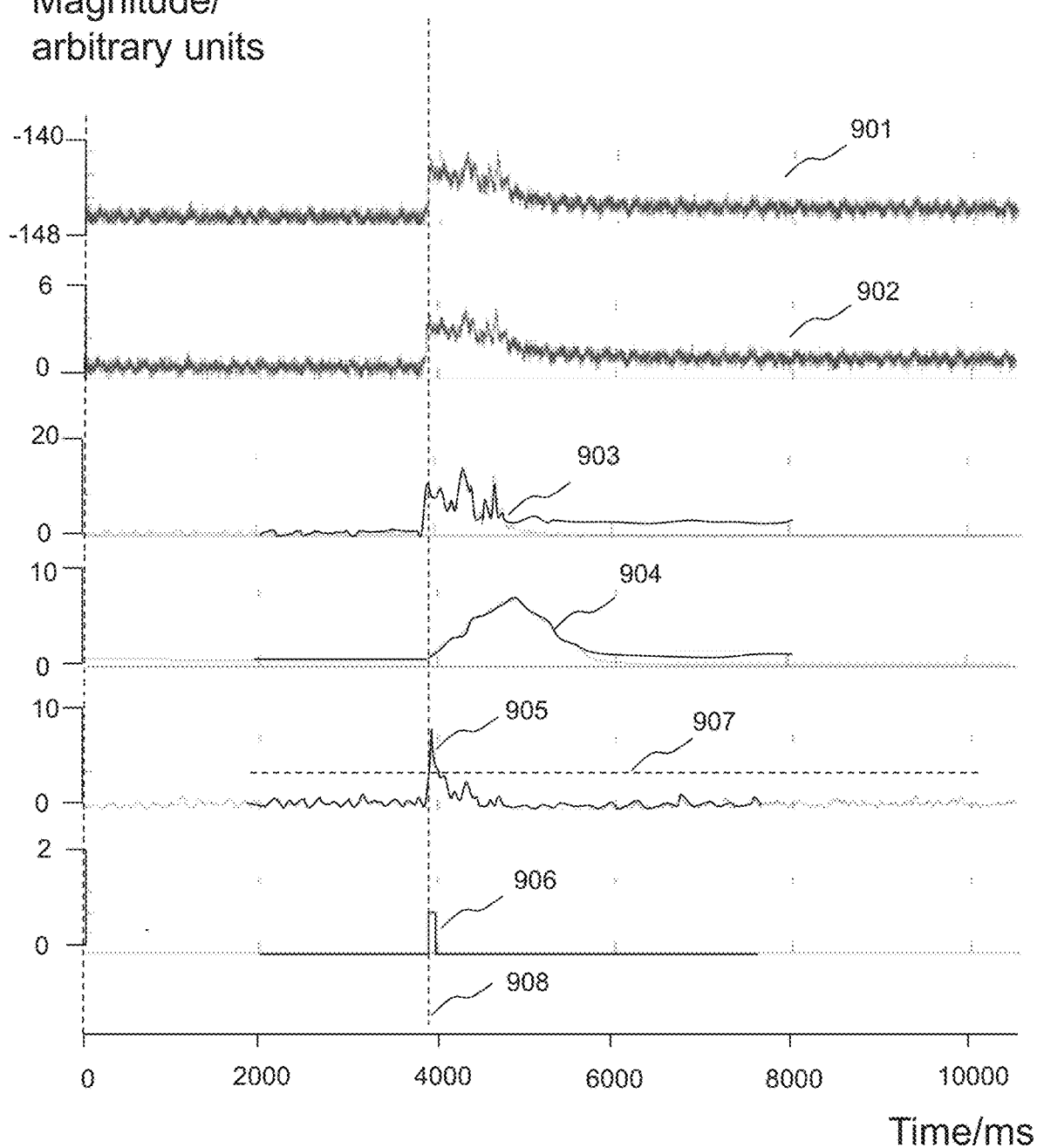
FIG. 9 shows a graphical representation of successive stages of processing of an output from a deformation sensor and detection of whether the processed signal meets a pre-determined criterion In various examples.

FIG. 9 shows a graphical representation of an example of successive stages of processing of an output from a deformation sensor and detection of whether the processed signal meets a pre-determined criterion. In this example, trace 901 shows a signal output from a deformation sensor, in the form of a representation of a voltage generated on the basis of a resistance of the deformation sensor. It can be seen from the magnitude scale, in arbitrary units, that there is a constant offset, that is to say a DC (direct current) offset from zero for the original signal, in this case approximately −146 units. The offset may be considerably different for different deformation sensors.

As illustrated, the baseline DC component is shown to be removed (e.g., as may be accomplished with a high-pass band filter). It can be seen that the baseline is at approximately 0 units, although a small positive offset may remain. A running short-term average is calculated. This involves applying averaging over a sliding window in time, for example a 5 ms sliding window. The result of the short-term averaging is shown as trace 903. An example long-term average, for example a 5000 ms sliding window, is shown as trace 904. A ratio of the short-term average to the long-term average is shown as trace 905, along with a threshold 907. A resulting comparison is shown as trace 906. Trace 906 is in the form of a digital signal, representing the detection that the output of the sensor exceeds a given threshold. The process may be carried out on the output of each of the sensors.

Figure 10:
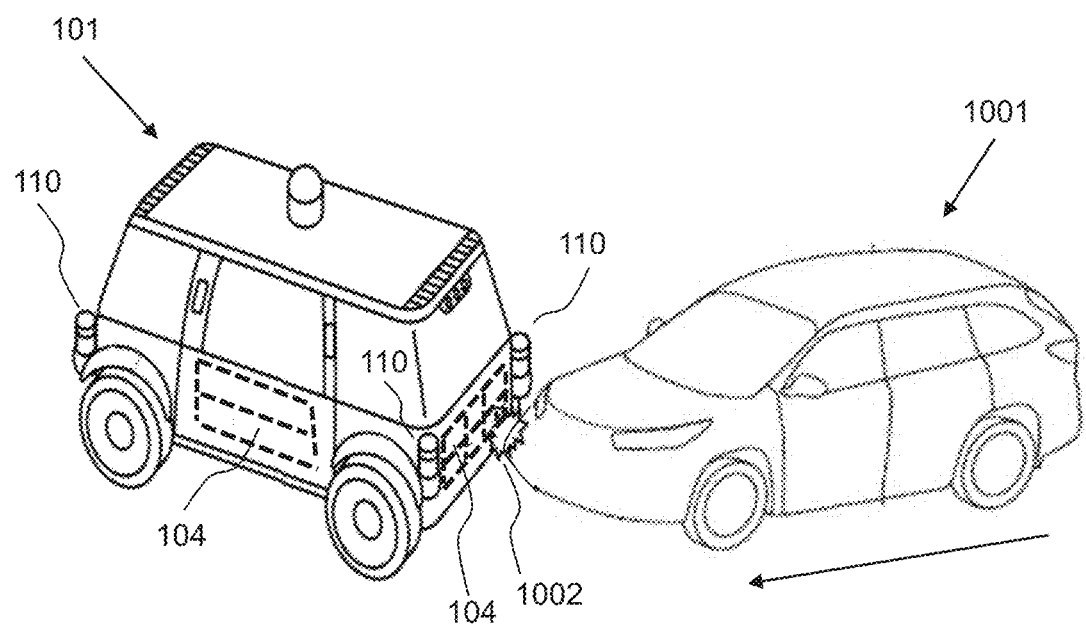
FIG. 10 shows a schematic representation of a collision of another vehicle with the vehicle showing the position of the impact, the deformation sensors and sensor pods having further sensors such as microphones.

FIG. 10 shows a schematic representation of a collision of another vehicle 1001 with the vehicle 101 showing the position of the impact 1002, the deformation sensors 104 and sensor pods 110 having further sensors such as microphones, cameras, radars, lidars, etc. The outputs from the deformation sensors may be processed to determine a position of the impact on the body of the vehicle based on a position of a deformation sensor having a detected output. For example, the position of the deformation sensor having the highest output may be taken as an estimate of the position of the impact. Of course, finer localization of impact may be obtained by triangulation using voltage signals, ratios, averages, relative positions and/or orientations, etc. of one or more neighboring sensors. In various such examples, the levels of the outputs of several sensors may be used to deduce the position of an impact between sensors, by deducing a distance of the impact from a sensor according to the level of the output of a sensor. For example, a higher output may indicate that the sensor is located closer to an impact. Location of impact may be deduced by interpolation between positions of the sensors.

Signals from the further sensors may be used to confirm the position of the impact. For example, an array of microphones may be used to detect the sound of an impact. Comparison of the levels of the audio signals and also the timing of the audio signals may be used to deduce the position of the impact. The position deduced using the deformation sensors may be used with the position deduced using the further sensors to generate a combined estimate of position of the impact on the vehicle, which may have a higher confidence level than the separate estimates of position.

Figure 11:
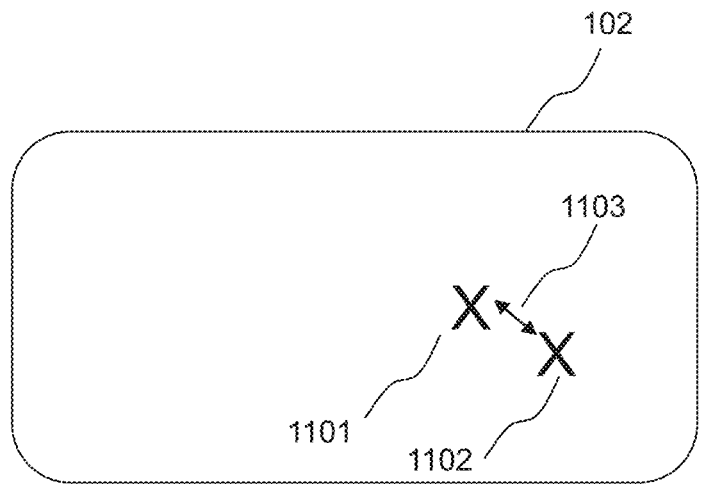
FIG. 11 shows a schematic representation of a panel of the vehicle showing a determined position of an impact based on processing outputs from the deformation sensors and a determined position of an impact based on processing outputs from other sensors, for example microphones.

FIG. 11 shows a schematic representation of a panel 102 of the vehicle showing a determined position of an impact based on processing outputs from the deformation sensors 1101 and a determined position of an impact based on processing outputs from other sensors 1102, for example microphones. Microphone data may be used to localize an impact based on the relative magnitude of output signals of an array of microphones. For example, the position of an impact may be estimated by interpolating between magnitude values of output signals of the array of microphones and/or extrapolating to find the likely position of a maximum value. Alternatively or in addition, relative delay values of detected signals from the microphones may be used to localize the impact. The delay from the impact site to a microphone may be taken as an indication of relative distance of the microphone to the impact site. Additional details of such techniques may be found in U.S. patent application Ser. No. 17/554,570 filed on Dec. 17, 2021 entitled "Event Detection and Localization Using Audio," the entire contents of which are hereby incorporated by reference.

The difference between the two estimates is shown as 1103. If the difference between the two estimates is less than a threshold value, then a confidence level in the indication of an impact is increased. The process of increasing confidence that the impact has occurred can accordingly comprise performing an additional determination of the position of the impact on the body using sensors selected from microphones, video sensors, RADAR sensors, or LIDAR sensors and comparing the additional determination of the position with the estimated position derived from processing the outputs from a plurality of deformation sensors. The indication of an impact may be generated in dependence on the distance between the estimated position and the position determined by the additional determination meeting a criterion, for example being less than a threshold value.

Figure 12:
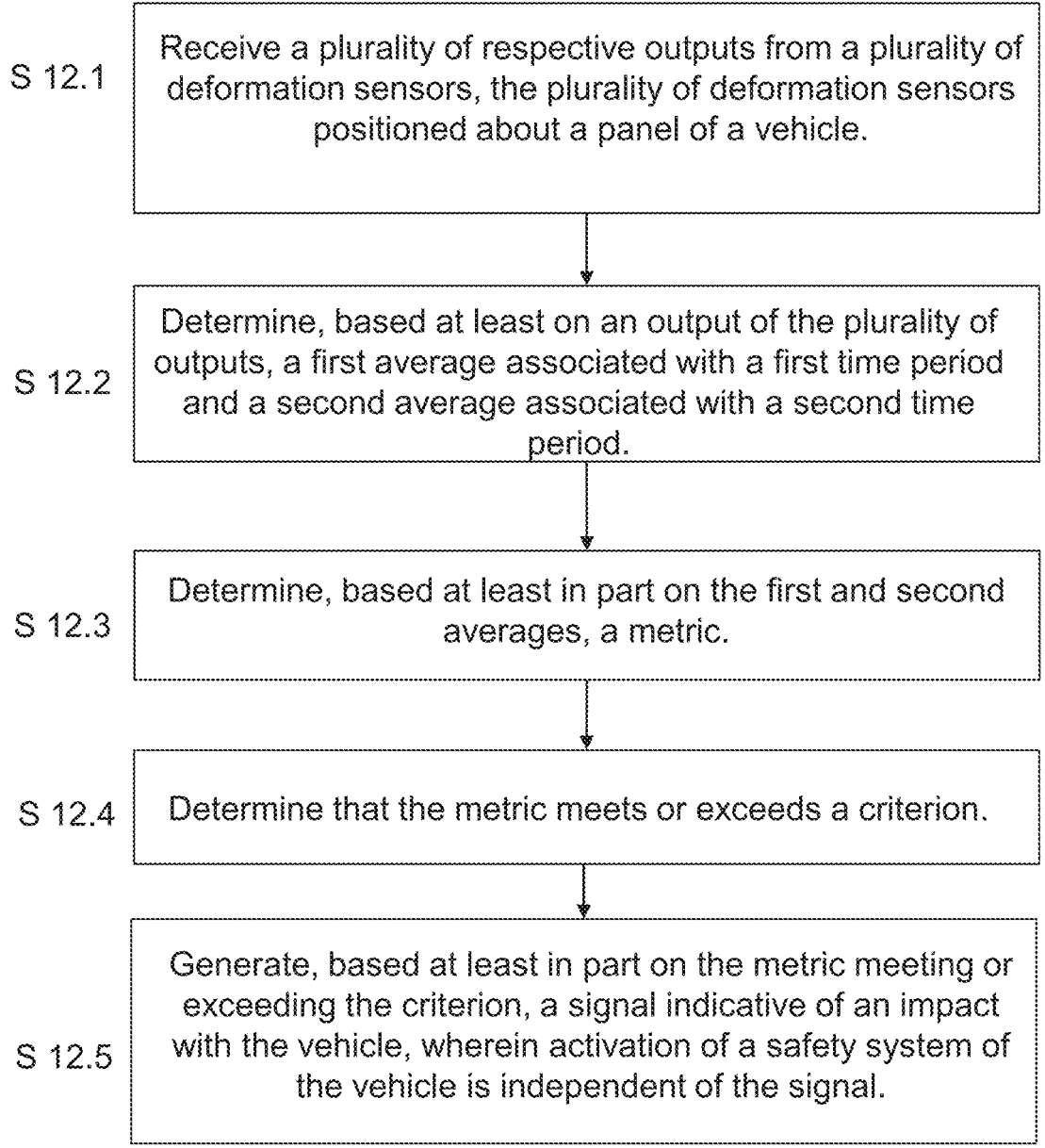
FIG. 12 is a flow diagram illustrating a method of generating an indication of an impact In various examples.

FIG. 12 is a flow diagram illustrating a method of generating an indication of an impact in various examples, by steps S12.1 to S12.5.

At step S12.1, a plurality of respective outputs are received from a plurality of deformation sensors, the plurality of deformation sensors positioned about a panel of a vehicle. At step S12.2, based at least on an output of the plurality of outputs, a first average associated with a first time period and a second average associated with a second time period are determined. At step S12.3, based at least in part on the first and second averages, a metric is determined. The metric may, for example, comprise a ratio of the first and second averages, or, for example, a square of a difference between the first and second averages. At step S12.4, it is determined that the metric meets or exceeds a criterion, for example it may be determined that the metric meets or exceeds a respective threshold associated with a deformation sensor. At step S12.5, based at least in part on the metric meeting or exceeding the criterion, a signal indicative of an impact with the vehicle is generated, activation of a safety system of the vehicle being independent of the signal. The safety system may be for example, a restraint system such as an airbag activation system. For example, the signal indicative of an impact may be generated whilst the safety system remains in a first state, the first state being a state before triggering of the safety system and a second state of the safety system being a state in which the safety system has been triggered in response to impact.

In various examples, a characteristic of an object having the impact with the vehicle may be deduced based on detected outputs from more than one deformation sensor. For example, if outputs of adjacent sensors are detected above a threshold over a larger area, it may be deduced that the impact is with a larger object. Patterns of outputs from sensors may be recognized by comparison with stored patterns, representing impacts with various classes of objects. For example, simulations may be carried out of the whole vehicle including the panels to which deformation sensors are attached, similar to a crash impact simulation, but for a lower energy impact. Collisions with different objects may be simulated, at different parts of the vehicle, and the amount of deformation at the location of each deformation may be recorded for each case. The library of patterns obtained in this way may be compared with the outputs of sensors obtained in real time, or based on stored data after a collision, to deduce what type of object may be involved, travelling at what speed, for example.

In various examples, the processing the plurality of respective outputs from the plurality of deformation sensors may comprise machine learning, for example supervised machine learning. For example, a series of trial collisions with various objects may be carried out, and a machine learning algorithm may be trained to recognize various classes of collision. For example, weights of a neural network may be trained to produce outputs detecting various classes of collision. The plurality of respective outputs from the plurality of deformation sensors may be applied in real time as inputs to a neural network. The outputs may be outputs which have been processed to increase a sensitivity to short-term changes in comparison to long-term changes, for example by providing a ratio of a short-term to long-term average of samples of the deformation sensor outputs as already described. The neural network may be programmed to categorize an impact. The neural network may be trained by a process comprising the steps of performing a plurality of trial impacts on a vehicle, recording data for respective impacts of the plurality of trial impacts. The recorded data may be, for example, data indicating a position of the impact on the vehicle, dynamic properties of the impact, and the type of object in an impact. The data may be categorized into a plurality of categories, and the neural network may be trained to recognize a category on the basis of the plurality of respective outputs. The categories may be, for example, a collision with another vehicle, a collision with a person, or a collision with a bicycle.

Figure 13:
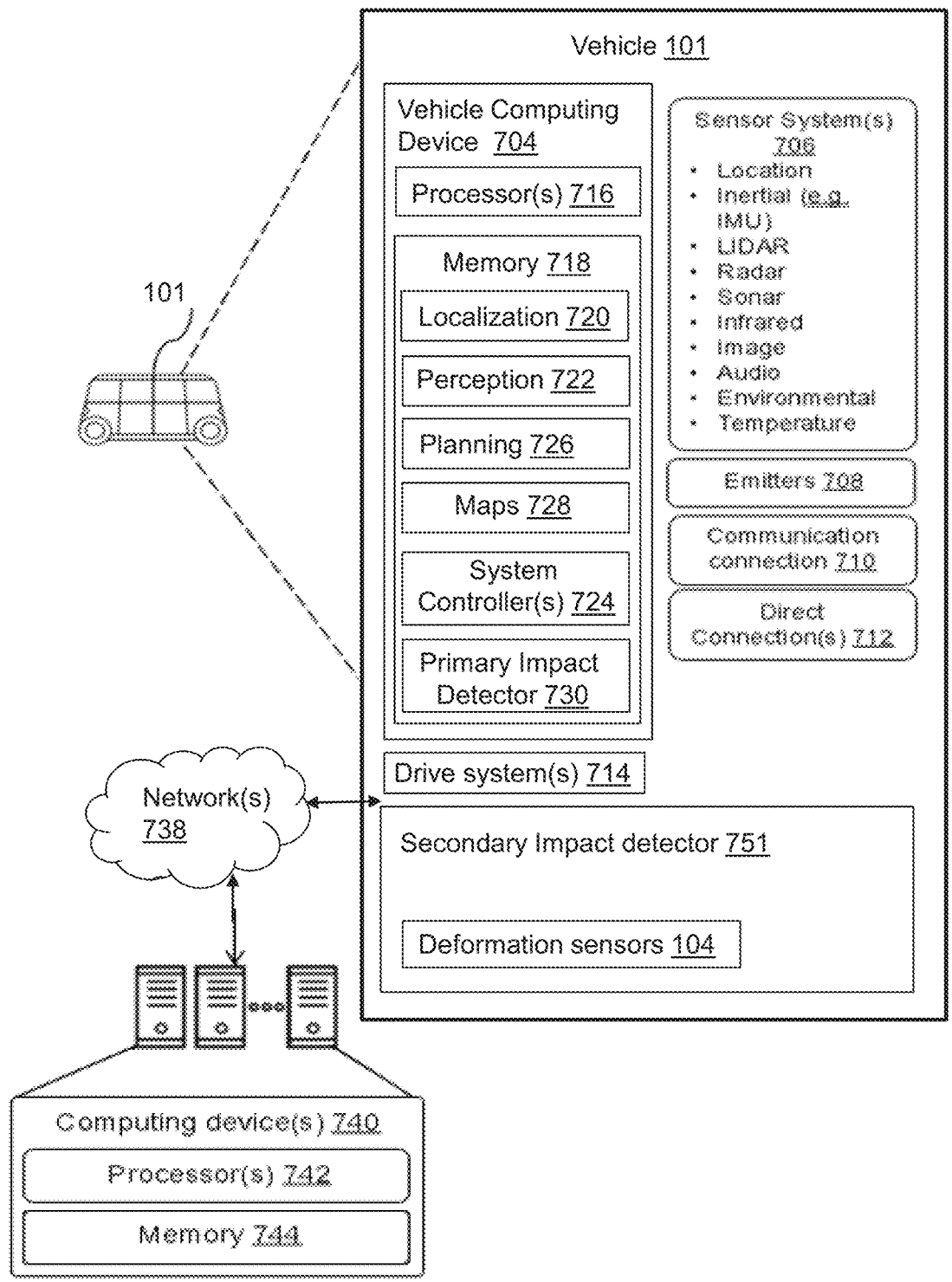
FIG. 13 is a block diagram of an autonomous vehicle comprising a vehicle control system and primary and secondary impact detector systems.

FIG. 13 depicts a block diagram of an example system for implementing at least some of the techniques described herein.

In various examples, the system includes the vehicle 101. As illustrated, the vehicle 101 has a primary impact detector 730 and a secondary impact detector 751, comprising deformation sensors 104, as already described. The vehicle computing device 704 may comprise the one or more processors configured to generate the indication of an impact. Alternatively, the one or more processors may be stand-alone device(s) and may send the indication of the impact to the vehicle computing device 704.

In some instances, the vehicle 101 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 101 may be a fully or partially autonomous vehicle having any other level or classification. Moreover, in some instances, the techniques described herein may be usable by non-autonomous vehicles as well.

The vehicle 101 can include vehicle computing device(s) 704, one or more sensor systems 706, one or more emitters 708, one or more communication connections 710, at least one direct connection 712 (e.g., for physically coupling the vehicle 101 to exchange data and/or to provide power), and one or more drive systems 714.

In some instances, the sensor(s) 706 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 706 may include multiple instances of each of these or other types of sensors. For instance, the LIDAR sensors may include individual LIDAR sensors located at the corners, front, back, sides, and/or top of the vehicle 101. As another example, the cameras may include multiple cameras disposed at various locations about the exterior and/or interior of the vehicle 101. The sensor(s) 706 may provide input to the vehicle computing device(s) 704.

The vehicle 101 may also include the emitter(s) 708 for emitting light and/or sound. The emitter(s) 708 in this example may include interior audio and visual emitter(s) to communicate with passengers of the vehicle 101. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 101 may also include the communication connection(s) 710 that enable communication between the vehicle 101 and one or more other local or remote computing device(s). For instance, the communication connection(s) 710 may facilitate communication with other local computing device(s) on the vehicle 101 and/or the drive system(s) 714. Also, the communication connection(s) 708 may additionally or alternatively allow the vehicle 101 to communicate with other nearby computing device(s) (e.g., other nearby vehicles, traffic signals, etc.). The communication connection(s) 710 may additionally or alternatively enable the vehicle 101 to communicate with a computing device 736.

The vehicle computing device(s) 704 can include one or more processors 716 and memory 718 communicatively coupled with the one or more processors 716. In the illustrated example, the memory 718 of the vehicle computing device(s) 704 stores a localization component 720 perception component 722, a planning component 724, one or more maps 726, and one or more system controllers 728. The memory 718 may also include an interaction detector 730. The interaction detector 730 may be at least part of the primary impact detection system. The interaction detector 730 may be configured to monitor output voltages from the one or more interaction sensors, as part of a main control unit, and determine whether a low-level interaction has taken place. Though depicted in FIG. 15 as residing in memory 718 for illustrative purposes, it is contemplated that the localization component 720, the perception component 722, the planning component 724, the one or more maps 726, and the one or more system controllers 728 may additionally, or alternatively, be accessible to the vehicle 101 (e.g., stored remotely).

In some instances, the localization component 720 may be configured to receive data from the sensor system(s) 706 to determine a position and/or orientation of the vehicle 101 (e.g., one or more of an x-, y-, z-position, roll, pitch, or yaw). For example, the localization component 720 may include and/or request/receive a map 726 of an environment and may continuously determine a location and/or orientation of the autonomous vehicle within the map 726.

In some instances, the perception component 722 can include functionality to perform object detection, segmentation, and/or classification. In some examples, the perception component 722 can provide processed sensor data that indicates a presence of an entity that is proximate to the vehicle 101 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 724 may determine a location of a user based on image data of an environment received from the user using, for example, bags of binary words with image-based features, artificial neural network, and the like. Further, the planning component 724 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 101 may stop to pick up a passenger. In at least one example, the planning component 724 may determine a pickup location based at least in part on determining a user identity (e.g., determined via image recognition or received as an indication from a user device, as discussed herein).

In some instances, the one or more maps 726 may be used by the vehicle 101 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 726 may be stored based on, for example, a characteristic (e.g., type of entity, time of day, day of week, season of the year, etc.). Storing multiple maps 726 may have similar memory requirements, but increase the speed at which data in a map may be accessed.

In at least one example, the vehicle computing device(s) 704 can include one or more system controllers 728. The system controller 728 can be configured to control steering, propulsion, braking, safety, emitters, communication, and other systems of the vehicle 101. The system controller(s) 728 can communicate with and/or control corresponding systems of the drive system(s) 714 and/or other components of the vehicle 101. The system controller(s) 728 may be communicatively coupled to one or more sensors of the vehicle sensor system(s) 706.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s).

In some examples, the vehicle 101 can send operational data, including raw or processed sensor data from the sensor system(s) 706, to one or more computing device(s) 740 via the network(s) 738. The one or more computing device(s) 740 may comprise one or more processors 742 and memory 744. The one or more computing devices 740 may be remote from the vehicle.

In some instances, aspects of some or all of the components discussed herein may include any models, algorithms, and/or machine learning algorithms. For example, the component(s) in the memory 718, 744 may be implemented as a neural network. As can be understood in the context of this disclosure, a neural network can utilize machine learning, which can refer to a broad class of such algorithms in which an output is generated based on learned parameters.

Example Clauses

A. A vehicle comprising: a primary impact detection system capable of causing a safety system to change state from a first state, the first state being a state before triggering of the safety system, to a second state, the second state being a triggered state, in response to impact; and a secondary impact detection system comprising: a plurality of deformation sensors associated with a panel of the vehicle, a deformation sensor of the plurality of deformation sensors configured to generate a signal in response to a deformation of the panel; and one or more processors configured to: receive the signal; determine, based at least in part on the signal, a first average associated with a first period of time; determine, based at least in part on the signal, a second average associated with a second period of time longer than the first period of time; determine, based at least in part on the first average and the second average, a metric; determine that the metric meets or exceeds a criterion; and determine, based at least in part on the metric meeting or exceeding the criterion, that an impact has occurred with the vehicle, wherein the secondary impact detection system is capable of generating an indication that an impact has occurred whilst the safety system remains in the first state.

B. The vehicle of example A, wherein the one or more processors are further configured to: receive an additional signal from the plurality of deformation sensors; determining, based at least in part on the additional signal, a third average associated with the first time period and a fourth average associated with the second time period; and determining an additional metric based at least in part on the third and fourth averages, wherein determining the impact has occurred is further based at least in part on the additional metric.

C. The vehicle of example B, wherein the additional signal is received from an additional deformation sensor proximate the deformation flex sensor.

D. The vehicle of example B or example C, wherein the operations further comprise determining, based at least in part on the metric and the additional metric, a position on the panel associated with the impact.

E. The vehicle of any one of examples A-D, wherein determining the metric comprises one or more of: filtering the signal, determining a difference of the first average and the second average, or determining a ratio of the first average and the second average.

F. A method comprising: receiving a plurality of respective outputs from a plurality of deformation sensors, the plurality of deformation sensors positioned about a panel of a vehicle; determining, based at least on an output of the plurality of outputs, a first average associated with a first time period and a second average associated with a second time period; determining, based at least in part on the first and second averages, a metric; determining that the metric meets or exceeds a criterion; and generating, based at least in part on the metric meeting or exceeding the criterion, a signal indicative of an impact with the vehicle, wherein activation of a safety system of the vehicle is independent of the signal.

G. The method of example F, wherein determining the metric comprises one or more of: determining a ratio of the first and second averages, or determining a difference of the first and second averages.

H. The method of example G, wherein determining that an impact has occurred with the vehicle comprises: receiving an additional output from the plurality of deformation sensors; determining, based at least in part on the additional output, a third average associated with the first time period and a fourth average associated with the second time period; and determining an additional metric based at least in part on the third and fourth averages, wherein determining that the impact has occurred is further based at least in part on the additional metric.

I. The method of example H, wherein generating the signal is further based at least in part on determining that the additional ratio meets or exceeds a second threshold, the second threshold being different from the first threshold.

J. The method of example H or example I, further comprising determining one or more of a location or a size associated with the impact based at least in part on the metric and the additional metric.

K. The method of any one of examples H-J, wherein the additional output is from an additional deformation sensor proximate the deformation sensor determined at least in part from a look-up table.

L. The method of any one of examples F-K, comprising disposing the plurality of deformation sensors to provide a greater number of sensors per unit area of the body of the vehicle in an area of the body having greater flexibility then a number of sensors per unit area of the body of the vehicle in an area of the body having less flexibility.

M. The method of any one of examples F-L, wherein a first sensor of the plurality of sensors is oriented along a first axis and a second sensor of the plurality of sensors is oriented along a second axis substantially perpendicular to the first axis, and the first sensor at least partially overlapping the second sensor.

N. The method of any one of examples F-M, wherein generating the signal is further based at least in part on one or more of sensor data received from one or more of microphones, video sensors, RADAR sensors, or LIDAR sensors.

O. The method of any one of examples F-N, further comprising performing a maneuver based at least in part on the signal.

P. The method of any one of examples F-O, comprising: inputting the plurality of outputs into a neural network; and receiving, from the neural network, the signal.

Q. One or more non-transitory computer-readable media storing instructions executable by one or more processors, wherein the instructions, when executed, cause the one or more processors to perform operations comprising: receiving an output from a deformation sensors positioned about a panel of a vehicle; determining, based at least on the output, a first average associated with a first time period and a second average associated with a second time period; determining, based at least in part on the first and second averages, a metric; determining that the metric meets or exceeds a criterion; and generating, based at least in part on the metric meeting or exceeding the criterion, a signal indicative of an impact with the vehicle.

R. The one or more non-transitory computer-readable media of example Q, wherein determining the metric comprises one or more of: determining a ratio of the first and second averages, or determining a difference of the first and second averages.

S. The one or more non-transitory computer-readable media of example Q or example R, wherein the deformation sensor is one of a plurality of deformation sensors and the output is one of a plurality of outputs, and wherein determining that an impact has occurred with the vehicle comprises: determining, based at least in part on an additional output of the plurality of outputs, a third average associated with the first time period and a fourth average associated with the second time period; and determining an additional metric based at least in part on the third and fourth averages, wherein determining that the impact has occurred is further based at least in part on the additional metric.

T. The one or more non-transitory computer-readable media of any one of examples Q-S, storing instructions executable by one or more processors, wherein the instructions, when executed, cause the one or more processors to perform operations comprising one or more of: causing the vehicle to send the indication of the impact in a message from the vehicle to report an incident to a highway authority, perform a stopping maneuver, broadcast one or more of an audio or visual message to an occupant of the vehicle, or broadcast one or more of an additional audio or additional video message to a pedestrian proximate the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A vehicle comprising:
   a primary impact detection system capable of causing a safety system to change state from a first state, the first state being a state before triggering of the safety system, to a second state, the second state being a triggered state, in response to impact; and
   a secondary impact detection system comprising:
      a plurality of deformation sensors associated with a panel of the vehicle, a deformation sensor of the plurality of deformation sensors configured to generate a signal in response to a deformation of the panel; and
      one or more processors configured to:
         receive the signal;
         determine a first average of the signal associated with a first period of time;
         determine a second average of the signal associated with a second period of time longer than the first period of time;
         determine, based at least in part on the first average and the second average, a metric, wherein determining the metric comprises one or more of: filtering the signal, determining a difference of the first average and the second average, or determining a ratio of the first average and the second average;
         determine that the metric meets or exceeds a criterion; and
         determine, based at least in part on the metric meeting or exceeding the criterion, that an impact has occurred with the vehicle,
      wherein the secondary impact detection system is capable of generating an indication that an impact has occurred whilst the safety system remains in the first state.

2. The vehicle of claim 1, wherein the one or more processors are further configured to:
   receive an additional signal from the plurality of deformation sensors;
   determining a third average of the additional signal associated with the first time period and a fourth average of the additional signal associated with the second time period; and
   determining an additional metric based at least in part on the third and fourth averages, wherein determining the additional metric comprises one or more of: filtering the additional signal, determining a difference of the third average and the fourth average, or determining a ratio of the third average and the fourth average;
   wherein determining the impact has occurred is further based at least in part on the additional metric.

3. The vehicle of claim 2, wherein the additional signal is received from an additional deformation sensor proximate the deformation flex sensor.

4. The vehicle of claim 2, wherein the operations further comprise determining, based at least in part on the metric and the additional metric, a position on the panel associated with the impact.

5. A method comprising:
   receiving a plurality of respective outputs from a plurality of deformation sensors, the plurality of deformation sensors positioned about a panel of a vehicle;
   determining a first average of an output of the plurality of outputs associated with a first time period and a second average of the output of the plurality of outputs associated with a second time period;
   determining, based at least in part on the first and second averages, a metric, wherein determining the metric comprises one or more of: filtering the output of the plurality of outputs, determining a difference of the first average and the second average, or determining a ratio of the first average and the second average;
   determining that the metric meets or exceeds a criterion; and
   generating, based at least in part on the metric meeting or exceeding the criterion, a signal indicative of an impact with the vehicle,
   wherein activation of a safety system of the vehicle is independent of the signal.

6. The method of claim 5, comprising:
   receiving an additional output from the plurality of deformation sensors;
   determining a third average of the additional output associated with the first time period and a fourth average of the additional output associated with the second time period; and
   determining an additional metric based at least in part on the third and fourth averages, wherein determining the additional metric comprises one or more of: filtering the additional output, determining a difference of the third average and the fourth average, or determining a ratio of the third average and the fourth average;
   wherein generating the signal is further based at least in part on the additional metric.

7. The method of claim 6, wherein generating the signal is further based at least in part on determining that the additional metric meets or exceeds a second criterion, the second criterion being different from the criterion.

8. The method of claim 6, further comprising determining one or more of a location or a size associated with the impact based at least in part on the metric and the additional metric.

9. The method of claim 6, wherein the additional output is from an additional deformation sensor proximate the deformation sensor determined at least in part from a look-up table.

10. The method of claim 5, comprising disposing the plurality of deformation sensors to provide a greater number of sensors per unit area of the body of the vehicle in an area of the body having greater flexibility than a number of sensors per unit area of the body of the vehicle in an area of the body having less flexibility.

11. The method of claim 5, wherein a first sensor of the plurality of sensors is oriented along a first axis and a second sensor of the plurality of sensors is oriented along a second axis substantially perpendicular to the first axis, and
    the first sensor at least partially overlapping the second sensor.

12. The method of claim 5, wherein generating the signal is further based at least in part on one or more of sensor data received from one or more of microphones, video sensors, RADAR sensors, or LIDAR sensors.

13. The method of claim 5, further comprising performing a maneuver based at least in part on the signal.

14. The method of claim 5, comprising:
    inputting the plurality of outputs into a neural network; and
    receiving, from the neural network, the signal.

15. One or more non-transitory computer-readable media storing instructions executable by one or more processors, wherein the instructions, when executed, cause the one or more processors to perform operations comprising:
    receiving an output from a deformation sensors positioned about a panel of a vehicle;
    determining a first average of the output associated with a first time period and a second average of the output associated with a second time period;
    determining, based at least in part on the first and second averages, a metric, wherein determining the metric comprises one or more of: filtering the output, determining a difference of the first average and the second average, or determining a ratio of the first average and the second average;
    determining that the metric meets or exceeds a criterion; and
    generating, based at least in part on the metric meeting or exceeding the criterion, a signal indicative of an impact with the vehicle.

16. The one or more non-transitory computer-readable media of claim 15, wherein the deformation sensor is one of a plurality of deformation sensors and the output is one of a plurality of outputs, and
    wherein the operations comprise:
        determining a third average of an additional output of the plurality of outputs associated with the first time period and a fourth average of the additional output associated with the second time period; and
        determining an additional metric based at least in part on the third and fourth averages, wherein determining the additional metric comprises one or more of: filtering the additional output, determining a difference of the third average and the fourth average, or determining a ratio of the third average and the fourth average,
        wherein generating the signal is further based at least in part on the additional metric.

17. The one or more non-transitory computer-readable media of claim 15, storing instructions executable by one or more processors, wherein the instructions, when executed, cause the one or more processors to perform operations comprising one or more of:
    causing the vehicle to send the indication of the impact in a message from the vehicle to report an incident to a highway authority,
    perform a stopping maneuver,
    broadcast one or more of an audio or visual message to an occupant of the vehicle, or
    broadcast one or more of an additional audio or additional video message to a pedestrian proximate the vehicle.

\* \* \* \* \*